Nov. 10, 1925. 1,560,646
W. J. BELCHER
POWER TRANSMITTING CHAIN
Filed June 14, 1923 2 Sheets-Sheet 1
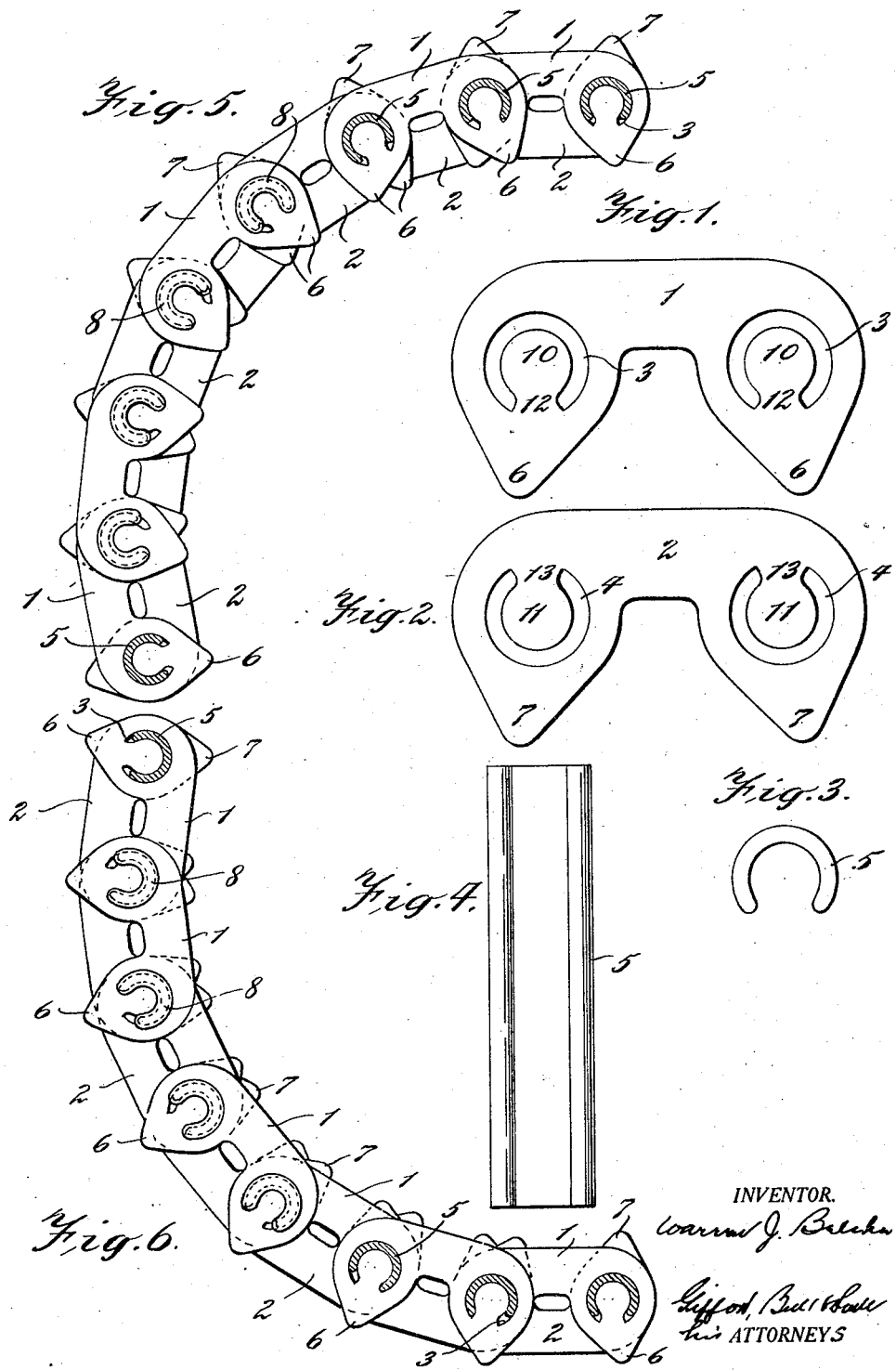
INVENTOR.
Warren J. Belcher
Gifford, Bull & Houser
his ATTORNEYS Nov. 10, 1925.
W. J. BELCHER
POWER TRANSMITTING CHAIN
Filed June 14, 1923
1,560,646
2 Sheets-Sheet 2
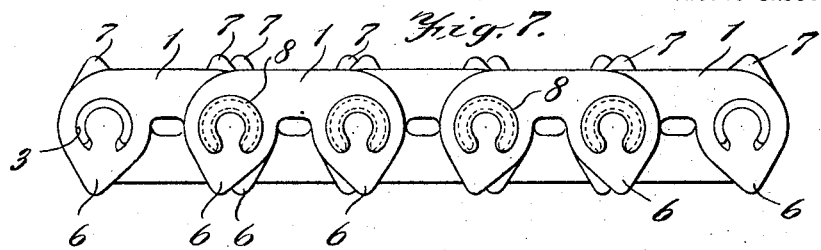
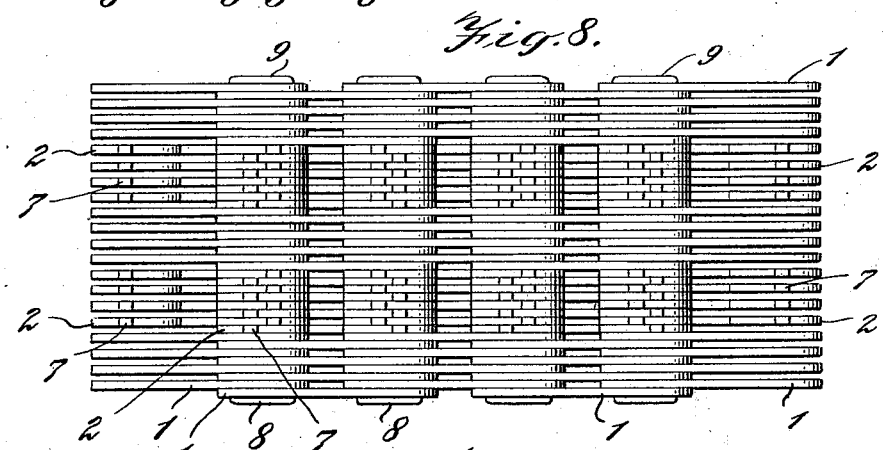
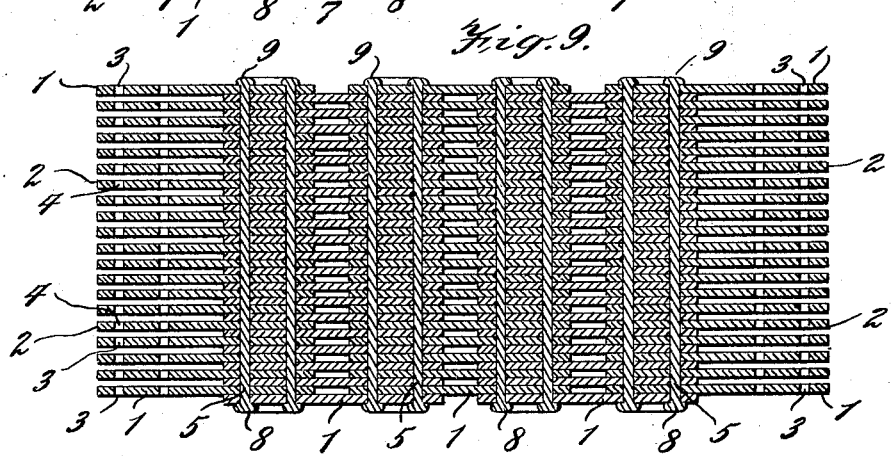
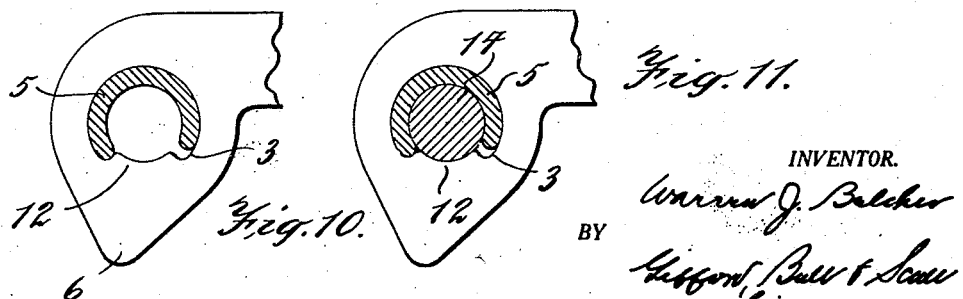
INVENTOR.
Warren J. Belcher
BY
Gifford, Bull & Scull
ATTORNEYS Patented Nov. 10, 1925.

1,560,646

UNITED STATES PATENT OFFICE.

WARREN J. BELCHER, OF HARTFORD, CONNECTICUT, ASSIGNOR TO THE WHITNEY MFG. CO., OF HARTFORD, CONNECTICUT, A CORPORATION OF CONNECTICUT.

POWER-TRANSMITTING CHAIN.

Application filed June 14, 1923. Serial No. 645,224.

*To all whom it may concern:*

Be it known that I, WARREN J. BELCHER, a citizen of the United States, residing at Hartford, county of Hartford, State of Connecticut, have invented certain new and useful Improvements in Power-Transmitting Chains, of which the following is a specification.

This invention is directed to the improvement or modification of the chain shown in my application Serial No. 563,532 filed May 25, 1922.

In the accompanying drawings I have shown a form in which I have embodied my invention in actual practice.

Figures 1 and 2 are enlarged side views to a scale of the form of links which I prefer at the present time; Figs. 3 and 4 are enlarged end and plan views to a scale of the longitudinally slotted sleeve; Fig. 5 is an edge view, partly in section, of the chain as it appears when bending round a sprocket on one side, and Fig. 6 is a corresponding view when bending round a sprocket on the opposite side; Fig. 7 is a corresponding view of the chain on a straight run; Fig. 8 is a plan view of Fig. 7, and Fig. 9 a section; Figs. 10 and 11 are details of possible modifications.

The links 1 and 2 are duplicates of each other excepting that the interrupted circular slots 3, 3, are the reverse of the interrupted circular slots 4, 4. This is to enable the links to be combined in inverse position on the slotted sleeve 5, as shown in Figs. 5, 6, 7 and 8. 6, 6, are teeth to engage with the sprocket when the chain is bent, as shown in Fig. 5; 7, 7, are teeth to engage with the sprocket when the chain is bent, as shown in Fig. 6. The teeth on each link diverge from each other at approximately the angle shown in the drawings.

The slotted sleeve 5 forms the pivotal connection between a plurality of side by side links 1, 1, and a corresponding plurality of adjacent side by side links 2, 2. It extends through the interrupted slots 3 and 4 of as many of the side by side links as may be desired and as exemplified in Figs. 5 to 9 where the links 1 and 2 are in series of eight each. The ends of the sleeve are upset at 8 and 9. Being of steel, the sides of the sleeve in the line of pull on the chain may spring to and fro under variations of strain.

The interrupted slots 3 and 4 each occupies about 300° of a circle; the approximately 60° interruption facing one side of the chain in link 1 and facing the opposite side of the chain in link 2. Or, in other words, the interruption of the slot faces toward the toothed edge of link 1 and faces away from the toothed edge of link 2.

10 and 11 are tongues integral with the link and formed by the cutting of the slots 3 and 4 therein, being connected with the links by the integral necks 12 and 13 by which the slots are interrupted. When the links 1 and 2 are combined, as shown in Figs. 5 to 9, upon the sleeve 5, the series of tongues 10 and 11 serve substantially as a rigid core stopping any tendency of the sleeve to collapse under the pull on the chain. The necks 12 and 13 also serve as a means for holding this core in position. The necks 12 and 13 also serve to maintain the position of the slotted sleeve such that the sides of the sleeve adjacent the ends of the slot are retained always in the line of pull, thereby insuring that the sleeve may spring under the pulling strain to the extent permitted by the core.

The sleeve occupies approximately 270° of a circle leaving a slot of approximately 90° in width. There is thus permitted an oscillatory play of approximately 30° between the sleeve and the slot which occurs when the bend of the chain is reversed from that shown in Fig. 5 to that shown in Fig. 6.

The thickness of the sleeve relatively to the width of the slot is such as to leave approximately .005 clearance between the inner wall of the sleeve and the inner side of the slot; also, approximately .0095 inch clearance between the outer wall of the sleeve and the outer side of the slot. The drawings do not undertake to show these clearances.

The above relative dimensions of the sleeve and link slot and the resilience of the sleeve are understood to be important contributions to the noiselessness of the chain in operation.

Although I have shown and described to a scale the chain as it is being constructed at the present time, nevertheless, I do not limit myself to this precise construction. Among the variations of which I know it to be susceptible is the omission of the tongues 10 and 11, while retaining the necks 12 and 13, as shown in Fig. 10, thus retaining the necks to hold the sleeve slot in position. If desired a core may be provided by a pin 14 extending throughout the sleeve as shown in Fig. 11.

I claim:

1. In a chain, in combination, a longitudinally slotted, hollow pivot of more than semi-circular extent, two series of toothed links pivoted thereon with links in each series the reverse of other links in the same series, and means whereby the slot is maintained facing transversely to the line of pull.

2. In a chain, in combination, a longitudinally slotted, hollow pivot of more than semi-circular extent, two series of links pivoted thereon, a pair of teeth on each link diverging from each other and links in each series the reverse of other links in the same series and means whereby the slot is maintained facing transversely to the line of pull.

3. In a chain, in combination, a longitudinally slotted, hollow pivot of more than semi-circular extent, two series of toothed links pivoted thereon with links in each series the reverse of other links in the same series, and means whereby the slot is maintained facing transversely to the line of pull; there being a clearance between the links and pivot.

4. In a chain, in combination, a longitudinally slotted, hollow pivot of more than semi-circular extent, two series of toothed links pivoted thereon with links in each series the reverse of other links in the same series, and means whereby the slot is maintained facing transversely to the line of pull; there being a clearance between the pivot and core and a clearance between the pivot and the links.

5. In a chain, in combination, a longitudinally slotted, hollow pivot of more than semi-circular extent, two series of toothed links pivoted thereon with links in each series the reverse of other links in the same series, and means whereby the slot is maintained facing transversely to the line of pull; there being a clearance next the pivot, both inside and outside, and at the ends of the circular slots.

WARREN J. BELCHER.